United States Patent [19]

Friedmann

[11] Patent Number: 4,729,464
[45] Date of Patent: Mar. 8, 1988

[54] APPARATUS FOR COMPENSATING FOR FLUCTUATIONS OF TRANSMISSION OF TORQUE BY AN INTERNAL COMBUSTION ENGINE

[75] Inventor: Oswald Friedmann, Lichtenau, Fed. Rep. of Germany

[73] Assignee: Luk Lamellen und Kupplungsbau GmbH, Bühl, Fed. Rep. of Germany

[21] Appl. No.: 745,016

[22] Filed: Jun. 14, 1985

[30] Foreign Application Priority Data

Jul. 24, 1984 [DE] Fed. Rep. of Germany ....... 3427163

[51] Int. Cl.$^4$ ........................... F16D 3/14; F16F 15/12
[52] U.S. Cl. ................................. 192/70.17; 192/106.2; 192/110 B; 74/574; 464/68
[58] Field of Search ............... 192/70.17, 30 V, 106.2, 192/110 B; 74/574, 572; 464/68, 66, 67

[56] References Cited

U.S. PATENT DOCUMENTS

| 1,541,411 | 6/1925 | Davis | 192/DIG. 1 |
| 2,116,739 | 5/1938 | Eason | 192/111 R |
| 3,129,794 | 4/1964 | Altmann et al. | 192/0.076 |

FOREIGN PATENT DOCUMENTS

| 1282473 | 11/1968 | Fed. Rep. of Germany | 192/52 |
| 815273 | 7/1937 | France | 192/70.29 |
| 73730 | 6/1978 | Japan | 192/30 V |
| 163360 | 12/1980 | Japan | 464/83 |

Primary Examiner—Rodney H. Bonck
Assistant Examiner—David A. Testardi
Attorney, Agent, or Firm—Peter K. Kontler

[57] ABSTRACT

Apparatus for transmission of torque between the crankshaft of the internal combustion engine and the input shaft of the change-speed transmission in a motor vehicle has a flywheel composed of two coaxial sections which are rotatable within limits relative to each other against the opposition of an interposed damper. One of the sections is bolted to the crankshaft and the other section is mounted on two antifriction bearings which surround a tubular support of the transmission housing. A friction clutch is interposed between the second section of the flywheel and the input shaft of the transmission. The mounting of the second section on the housing of the transmission, instead of customary mounting of one section on the other section, prolongs the useful life of the apparatus because the bearings are subjected to less pronounced and more uniformly distributed wear and each of their parts can be fully lubricated in response to engagement of the clutch.

16 Claims, 1 Drawing Figure

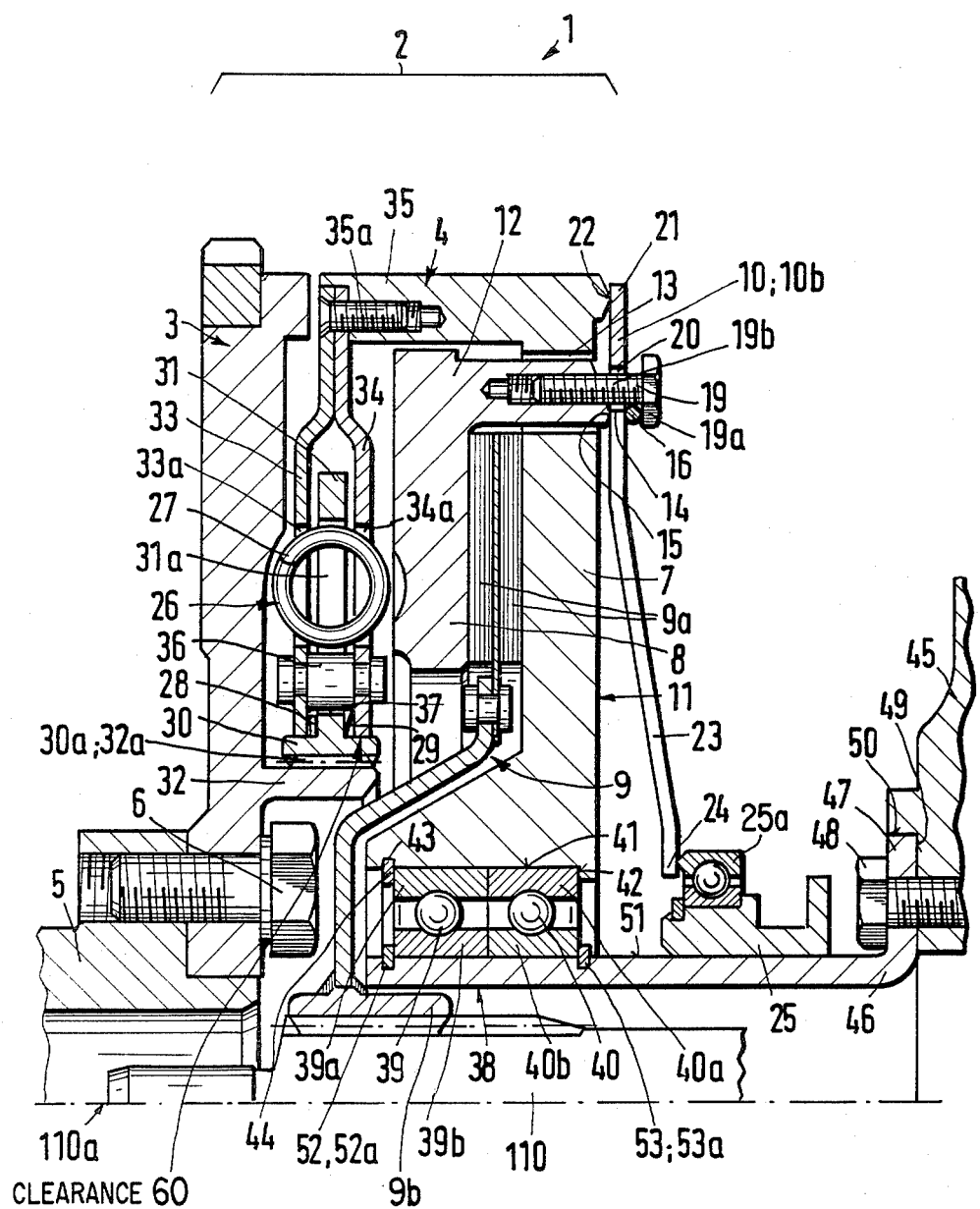

APPARATUS FOR COMPENSATING FOR FLUCTUATIONS OF TRANSMISSION OF TORQUE BY AN INTERNAL COMBUSTION ENGINE

BACKGROUND OF THE INVENTION

The present invention relates to shock compensating apparatus in general, and more particularly to improvements in apparatus which can be utilized with advantage to compensate for fluctuations of torque which is transmitted by the output element of an internal combustion engine. Still more particularly, the invention relates to improvements in apparatus which can be utilized in motor vehicles to compensate for fluctuations of torque transmission between the crankshaft of an internal combustion engine and the input shaft of a change-speed transmission.

It is well known to transmit torque from the crankshaft of an internal combustion engine to the input shaft of a change-speed transmission in a motor vehicle by means of a composite flywheel, one section of which rotates with the crankshaft and the other section of which rotates with the input shaft or can be coupled thereto by a friction clutch. The two sections of the composite flywheel can turn relative to each other within certain limits against the opposition of one or more vibration dampers. As a rule, one of the flywheel sections is rotatably journalled directly on the other flywheel section by means of one or more antifriction bearings. Reference may be had, for example, to commonly owned copending patent application Ser. No. 669,657 filed Nov. 8, 1984 by Oswald Friedmann.

The placing of a plain or antifriction bearing between the two sections of a composite flywheel brings about a number of serious drawbacks which are attributable primarily to the fact that the two sections merely have a rather limited freedom of angular movement relative to each other. This is particularly undesirable when the vehicle which embodies such composite flywheel is under load and the one and/or other flywheel section turns back and forth at a very high frequency but within a small or extremely small angle which is, or can be, much less than one degree. Such high-frequency but low-amplitude angular displacements of the two flywheel sections relative to each other entail very pronounced wear upon the plain or antifriction bearing or bearings. Moreover, the lubricating action upon the contacting surfaces of the plain bearing(s) or upon the areas of contact between the races and the rolling elements of the antifriction bearing(s) is highly unsatisfactory because the extent of angular movement between the contacting surfaces or between the races and rolling elements is very small. Furthermore, and if the bearing assembly between the two sections of the flywheel comprises one or more antifriction ball or roller bearings, the rolling elements apply to relatively small portions of the tracks of the respective races extremely pronounced and highly localized stresses which entails rapid destruction of the races as a result of the development of unevennesses in the form of recesses or grooves. Moreover, repeated rolling of each ball or an otherwise configurated rolling element along the adjacent small portion of the respective race or races results in chipping of the races whereby the material which is separated from the race or races leaves cracks or cavities with attendant rapid deterioration of and total destruction of the entire bearing or bearings.

OBJECTS AND SUMMARY OF THE INVENTION

An object of the invention is to provide a novel and improved torsion damping apparatus for use in motor vehicles and for other purposes which is constructed and assembled in such a way that localized wear upon small portions of bearings between the sections of a composite flywheel is prevented in a simple but efficient way.

Another object of the invention is to provide a motor vehicle which embodies the above outlined apparatus.

An additional object of the invention is to provide a novel and improved torque transmitting connection between the crankshaft of the internal combustion engine and the input shaft of the change-speed transmission in a motor vehicle.

A further object of the invention is to provide an apparatus which can be assembled in a time-saving operation, which can be taken apart with little loss in time, and which comprises a relatively small number of simple, compact and inexpensive parts.

Another object of the invention is to provide a novel and improved mounting for that section of a composite flywheel between the crankshaft of the engine and the input shaft of the change-speed transmission in a motor vehicle which is designed to transmit torque to the input shaft.

Still another object of the invention is to provide a novel and improved torsion damper which can be utilized in the above outlined apparatus.

An additional object of the invention is to provide a novel and improved method of preventing rapid and pronounced wear upon the bearing or bearings for the sections of the composite flywheel in an apparatus of the above outlined character.

A further object of the invention is to provide a simple but effective clutch disengaging device for use in the above outlined apparatus.

Another object of the invention is to provide a torsion damping apparatus which can be installed in existing motor vehicles as a superior substitute for heretofore known and utilized torsion damping apparatus.

An additional object of the invention is to provide a torsion damping apparatus whose damping action is more satisfactory and longer-lasting than that of heretofore known apparatus.

A further object of the invention is to provide an apparatus whose useful life is longer than that of conventional torsion damping apparatus.

The invention is embodied in an apparatus for transmitting torque between an internal combustion engine and the rotary input element of a transmission, particularly between the crankshaft of the internal combustion engine and the input shaft of the change-speed transmission in a motor vehicle. The apparatus comprises a composite flywheel which includes two or more coaxial flywheel sections including first and second sections which are rotatable within limits relative to each other, means for non-rotatably fastening the first section to the crankshaft of the engine, damper means for yieldably opposing rotation of the first and second sections relative to each other, means for preferably releasably coupling the second section to the input element of the transmission, and one or more plain and/or antifriction bearings for rotatably mounting the second section on the transmission. The housing of the transmission preferably includes a support (such as an elongated tubular body which spacedly and coaxially surrounds the input element), and the mounting means can be interposed directly between the second section and the support of the transmission housing so that it surrounds the support.

The coupling means preferably includes a friction clutch which is actuatable to effect and terminate the transmission of torque between the second section and the input element. The means for actuating the clutch is preferably reciprocable along the support. For example, the actuating means can comprise an annular portion which surrounds the aforementioned tubular body adjacent to the mounting means for the second section of the composite flywheel.

The damper means preferably comprises an output component which is non-rotatably secured to the second section of the composite flywheel, an input component which is non-rotatably secured to the first section of the flywheel, and means for non-rotatably but axially movably securing portions of one of the two components to each other to allow for separation of or for assembly of such portions by the simple expedient of moving the one and/or the other portion axially of the other and/or the one portion. One of the two portions can constitute a tubular extension of the first section of the composite flywheel, and the portion of the one component can comprise a hollow cylindrical hub which surrounds the extension. The securing means can comprise at least one axially parallel key provided on one of the portions (e.g., along the internal surface of the hub) and an axially parallel spline which is provided in or on the other portion (e.g., in the external surface of the extension) and receives the key with freedom of axial movement. It is preferred to provide the hub with an annulus of axially parallel internal teeth and to provide the extension with an annulus of axially parallel external teeth which mate with the internal teeth of the hub. The extension can constitute a hollow cylinder, and the aforementioned fastening means for the first section of the composite flywheel preferably includes a plurality of externally threaded members (such as bolts or screws) whose axes are parallel to the common axis of the sections and whose heads are located within the confines of the cylindrical extension.

Means is preferably provided for holding the second section of the composite flywheel against axial movement relative to the input element of the transmission, and such holding means can include or can form part of the mounting means.

The friction clutch preferably comprises an axially fixed first pressure plate which can constitute or form part of the second section of the flywheel, a second pressure plate which is movable axially of the first pressure plate, a clutch disc which is interposed between the two pressure plates and is non-rotatably affixed to the input element of the transmission, and a diaphragm spring which normally urges the second pressure plate toward the first pressure plate so that the customary linings of the clutch disc are clamped between the two pressure plates and the second section of the flywheel can transmit torque to the input element of the transmission as long as and whenever the engine rotates the first section of the flywheel. The output component of the damper means is preferably non-rotatably affixed to the first pressure plate. In order to enhance the compactness of the improved apparatus, the damper means is preferably installed between the first and second sections of the flywheel, the second pressure plate is installed between the damper means and the first pressure plate, and the first pressure plate is installed between the diaphragm spring and the clutch disc.

The energy storing circumferentially complete section of the diaphragm spring preferably constitutes the radially outermost section of such spring and bears against the radially outermost portion of the first pressure plate. The second section of the flywheel can be provided with apertures which are disposed radially inwardly of the outermost portion, and the second pressure plate can be formed with projections which extend through such apertures toward the diaphragm spring radially inwardly of the latter's marginal section in order to take the shanks of screws or analogous means for tiltably securing the diaphragm spring to the second pressure plate. Such clutch preferably further comprises a pair of seats which flank the diaphragm spring in the region of the securing means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary axial sectional view of a torsion damping apparatus which embodies one form of the present invention, with the friction clutch between the second flywheel section and the input shaft of the change-speed transmission shown in engaged condition.

DESCRIPTION OF THE PREFERRED EMBODIMENTS

The apparatus 1 which is shown in the drawing serves to compensate for fluctuations of torque between the crankshaft 5 of an internal combustion engine and the rotary input element or shaft 110 of the change-speed transmission of a motor vehicle. The apparatus comprises a composite flywheel 2 including a first section 3 which receives torque from the engine by way of the crankshaft 5 and an annulus of bolts, screws or analogous fastening means 6, and a second section 4 which can transmit torque to the input shaft 110. The section 4 comprises an axially fixed pressure plate 7 which forms part of a friction clutch, and such clutch further comprises a second pressure plate 8 which is held against rotation relative to but is movable axially toward and away from the pressure plate 7. A clutch plate or clutch disc 9 with two sets of friction linings 9a is disposed between the pressure plates 7 and 8; the hub 9b of the clutch disc 9 surrounds and transmits torque to the input shaft 110 of the transmission. To this end, the hub 9b can be provided with a set of internal teeth which mate with a set of external teeth of the shaft 110.

The means for yieldably biasing the axially movable pressure plate 8 toward the pressure plate 7 so as to clamp the linings 9a of the clutch disc 9 therebetween comprises a diaphragm spring 10 which is adjacent to the outer side 11 of the pressure plate 7, i.e., to that side of the section 4 which faces away from the axially movable pressure plate 8. The pressure plate 8 is provided with an annulus of axially extending projections 12 which extend through complementary apertures 13 of the pressure plate 7 and bear against the diaphragm spring 10 in a region 14 radially inwardly of the circumferentially complete annular marginal main section or portion 10b of the diaphragm spring. The latter can be tilted between an outer seat 16 and an inner seat 15. The seat 15 is formed by and is thus an integral part of the right-most portions of the projections 12. The outer seat 16 of the illustrated apparatus 1 is a wire ring which is held in the illustrated position by a set of securing means in the form of screws 19 whose shanks 19b extend into tapped bores of the respective projections 12. The heads 19a of the screws 19 overlie the adjacent portions of the seat 16, and the shanks 19b are radially outwardly adjacent to such portions of the seat 16 to center the latter with reference to the diaphragm spring 10. The diaphragm spring 10 has openings 20 for the shanks 19b. The radially outermost part 21 of the main section 10b of the diaphragm spring 10 normally bears against an annulus of protuberances 22 which are provided at the outer side 11 of the axially fixed pressure plate 7. The protuberances 22 can constitute a circumferentially complete bead on the pressure plate 7.

The diaphragm spring 10 further comprises a set of elongated elastic tongues or prongs 23 which extend radially inwardly from the main section 10b and whose tips 24 can be shifted axially (in a direction to the left, as viewed in the drawing) by the antifriction ball bearing 25a of the clutch actuating or disengaging device 25 whose annular portion is axially movable on and surrounds the external surface 51 of a tubular body or support 46 which, in turn, spacedly surrounds the input shaft 110 of the change-speed transmission. When the tips 24 of the prongs 23 are depressed by the outer race 25a of the antifriction bearing 25a, the projections 12 are caused to move in a direction to the left, as viewed in the drawing, so that the pressure plates 7 and 8 cease to clamp the linings 9a of the clutch disc 9, i.e., the composite flywheel 2 is then free to rotate relative to the input shaft 110 and/or vice versa.

A vibration damper 26 is installed between the sections 3 and 4 of the composite flywheel 2 to yieldably oppose limited angular movements of the sections 3 and 4 relative to each other. The damper 26 comprises a set of energy storing elements in the form of coil springs 27 (only one shown) as well as ring-shaped friction generating elements 28 and 29. The input component of the vibration damper 26 includes a hub 30 which has a radially outwardly extending flange 31 and surrounds a hollow cylindrical extension 32 of the flywheel 3. The extension 32 also forms part of the input component of the damper 26 and projects axially in a direction away from the crankshaft 5, i.e., toward the axially fixed pressure plate 7. The means for holding the hub 30 against rotation relative to the extension 32 comprises internal teeth or keys 30a on the hub which mesh with external teeth or keys 32a of the extension 32. The teeth 30a and 32a preferably constitute straight axially parallel keys so as to allow for rapid slipping of the hub 30 onto and its slipping off the extension 32 in the direction of the common axis 110a of the crankshaft 5 and input shaft 110.

The heads of the bolts 6 which secure the section 3 to the crankshaft 5 are located radially inwardly and within the confines of the extension 32.

The output component of the vibration damper 26 comprises two discs 33, 34 whose radially innermost portions are spaced apart from each other in the axial direction of the apparatus 1 and are disposed at the opposite sides of the flange 31 on the hub 30. Those portions of the discs 33, 34 which extend radially outwardly beyond the flange 31 are adjacent to each other and are jointly affixed to the cylindrical radially outermost portion 35 of the pressure plate 7 of the section 4 by a set of screws 35a or analogous affixing means. The portion 35 can constitute a circumferentially complete cylinder or a set of discrete projections extending toward the radially outermost portion of the section 3. Distancing elements in the form of rivets 36 (only one shown in the drawing) are used to fixedly secure the discs 33, 34 to each other in a region radially outwardly of and closely adjacent to the peripheral surface of the hub 30. The shanks of the rivets 36 extend through arcuate slots 37 of the flange 31 and thus cooperate with the flange to limit the extent of angular movability of the sections 3 and 4 relative to each other (the hub 30 and its flange 31 cannot rotate relative to the section 3, and the discs 33, 34 cannot rotate relative to the pressure plate 7 of the section 4).

The discs 33 and 34 are provided with windows 33a, 34a which register with the windows 31a of the flange 31 on the hub 30 of the vibration damper 26. Each set of windows 33a, 34a, 31a receives one of the coil springs 27. The dimensions and relative positions of the windows 33a, 34a and 31a relative to each other (as considered in the circumferential direction of the hub 30) are selected in such a way that the vibration damper 26 changes its resistance to angular movement of the sections 3 and 4 relative to each other in two or more stages. Such multi-stage mode of vibration damping between two relatively turnable constituents of a composite flywheel for use in motor vehicles or the like is well known in the art.

The apparatus 1 further comprises a bearing or mounting assembly 38 which is interposed between the housing or casing 45 of the change-speed transmission on the one hand, and the sections 3 and 4 on the other hand in order to allow such sections to perform their limited angular movements relative to each other (against the opposition or under the bias of the coil springs 27 and against the opposition of the friction generating elements 28, 29). The bearing or mounting assembly 38 surrounds the tubular support 46 and hence spacedly surrounds the input shaft 110 of the change-speed transmission for the motor vehicle. The illustrated assembly 38 comprises two coaxial and closely adjacent antifriction ball bearings 39 and 40 whose outer races 39a, 40a are installed in an axial bore 41 of the pressure plate 7, i.e., in the section 4. Each of the races 39a, 40a can be a press fit in the bore 41, and such outer races are held against axial movement relative to the pressure plate 7 by an internal shoulder 42 which is adjacent to the outer side of the race 40a and by a split ring 44 which is recessed into an internal groove 43 of the pressure plate 7. The inner races 39b, 40b of the antifriction ball bearings 39, 40 are in direct contact with and do not rotate relative to the external surface 51 of the tubular support 46 which is affixed to the housing or casing 45 of the change-speed transmission including the input shaft 110 by a set of bolts 48. The heads of the bolts 48 engage the exposed side of a radially outwardly extending flange 47 of the tubular support 46. The latter is recessed (at 49) into the main portion of the housing 45 and is coaxial with and spacedly surrounds the input shaft 110. This is ensured by the provision of a centering shoulder 50 which is machined into the housing 45 of the change-speed transmission and surrounds the flange 47. The shoulder 50 may but need not surround the entire flange 47. The clutch disengaging or actuating device 25 is slidable along the external surface 51 of the tubular support 46 between the antifriction bearings 39, 40 on the one hand and the heads of the bolts 48 on the other hand.

The means for holding the inner races 39b, 40b of the bearings 39, 40 (and hence the entire flywheel 4) against axial movement relative to the tubular member 46 and housing 45 comprises two split rings 52, 53 which respectively flank the inner races 39b, 40b and are received in circumferentially complete grooves 52a, 53a machined into the external surface 51 of the support 46.

The means for mounting the section 4 on the tubular support 46 of the transmission housing 45 can comprise a single antifriction ball bearing, one or more antifriction roller bearings or one or more plain bearings. Regardless of the exact nature of the mounting means, the races of the antifriction bearing(s) or the surfaces of the plain bearing(s) are compelled to rotate relative to each other regardless of whether the friction clutch including the pressure plates 7, 8, the clutch disc 9 and the diaphragm spring 10 is engaged, not through a small angle but through a succession of full revolutions. This will be readily appreciated by referring to the drawing since, when the crankshaft 5 drives the flywheel section 3, the latter rotates the section 4 whereby the pressure plate 7 of the section 4 rotates the outer races 39a, 39b of the bearings 39, 40 relative to the inner races 39b, 40b (which are non-rotatably affixed to the tubular support 46) so that the rolling elements of the bearings 39 and 40 cannot cause rapid and pronounced wear upon relatively small portions of the tracks which are defined by the respective pairs of races 39a, 39b and 40a, 40b. This further ensures fully automatic and thorough lubrication of all parts of each of the bearings which also contributes to longer useful life of the apparatus. If the mounting means comprises one or more plain bearings, the relatively movable parts of such bearings develop a film of lubricant which reduces the likelihood of pronounced wear. The mounting means can employ one or more hydrodynamically lubricated plain bearings in lieu of or in addition to one or more antifriction ball or roller bearings. The utilization of one or more antifriction ball or roller bearings between the section 4 and the tubular support 46 is preferred in many types of the improved apparatus because the rolling elements of such bearing or bearings roll along the entire tracks of the respective races with attendant reduction of wear, elimination of localized wear and highly satisfactory lubrication.

The tubular support 46 can constitute an integral part of the transmission housing 45. The making of a discrete tubular support 46 which is thereupon affixed to the housing 45 is preferred in many instances for convenience of manufacture as well as for convenience of mounting the section 4, the assembly 38 and the clutch actuating or disengaging means 25 thereon. Mounting of the actuating or disengaging means 25 directly on the tubular support 46 of the transmission housing 45 contributes to simplicity, compactness and lower cost of the apparatus 1 and ensures accurate guidance of the actuating means 25, i.e., accurate axial alignment with the sections 3 and 4 of the flywheel 2 as well as with the pressure plates 7, 8, clutch disc 9 and diaphragm spring 10 of the friction clutch between the section 4 and the input shaft 10.

The aforediscussed axial movability of the hub 30 and hollow cylindrical extension 32 of the flywheel section 3 relative to each other renders it possible to assemble the apparatus, or to take the apparatus apart, with little loss in time and with a high degree of accuracy and reproducibility. Moreover, the hollow extension 32 provides room for the heads of the fasteners 6, and such heads are imxediately accessible as soon as the section 4 is moved axially and away from the section 3 or at any time before the section 4 is returned to the illustrated position.

The aforedescribed construction and mounting of the friction clutch 7–10 between the flywheel section 4 and the input shaft 110 of the change-speed transmission also contributes to compactness, simplicity and lower cost of the apparatus. Thus, the clutch is practically integrated into the second flywheel section 4; the pressure plate 7 is a major component part of the section 4 as well as an important constituent of the friction clutch. However, it is equally within the purview of the invention to provide other types of means for preferably releasably coupling the second flywheel section 4 with the input shaft 110 of the change-speed transmission. For example, such coupling means can comprise a friction clutch with two pressure plates neither of which is an integral part of the flywheel section 4, a cover or housing which is affixed to the section 4 to transmit torque to the two discrete pressure plates, a clutch disc which can transmit torque to the input shaft 110, and a diaphragm spring or other suitable means for biasing the pressure plates against the respective sides of the clutch disc when the clutch is engaged.

The illustrated construction of the improved apparatus is highly desirable and advantageous on the additional ground that it contributes to compactness and simplicity of the apparatus. This is accomplished by the aforediscussed positioning of various parts of the apparatus 1 relative to each other, i.e, the damper 26 is installed between the sections 3, 4 of the flywheel 2, the pressure plates 7 and 8 flank the clutch disc 9 and the pressure plate 7 is located between the diaphragm spring 10 and the clutch disc 9 (all as considered in the direction of the common axis 110a of the flywheel sections 3, 4 and shafts 5, 10). As shown, the output component (discs 33, 34) of the damper 26 can be affixed directly to the radially outermost portion (35) of the second flywheel section 4. The provision of apertures 13 in the pressure plate 7 of the flywheel section 4 radially inwardly of the radially outermost portion 22, 35 of the section 4 for the projections 12 of the axially movable pressure plate 8 (so that the diaphragm spring 10 can be mounted directly on the axially movable pressure plate 8) also contributes to simplicity, compactness and lower cost of the improved apparatus.

An additional important advantage of the improved apparatus 1 is that the section 4, the friction clutch (including the pressure plates 7, 8, the clutch disc 9 and the diaphragm spring 10) and the vibration damper 26 can be assembled into a prefabricated unit which is then mounted on the housing 45 of the change-speed transmission before the latter is assembled with the engine, i.e., with the section 3 which receives torque from the crankshaft 5. All that is necessary is to engage the internal teeth or keys 30a of the hub 30 of the vibration damper 26 with the external teeth or keys 32a of the extension 32; the crankshaft 5 is then ready to transmit torque to the input shaft 110 with some freedom of angular movement as determined by the vibration damper 26, i.e., by the extent of movability of the shanks of rivets 36 in the respective arcuate slots 37 of the flange 31.

Another important advantage of the improved apparatus is that the eccentricity of the clutch disc 9 relative to the section 4 is negligible or zero; this reduces the wear upon the linings 9a of the clutch disc 9 with simultaneous reduction of radial stresses and wear upon the antifriction bearings 39, 40 of the mounting assembly 38 and upon the bearing or bearings (not shown) for the input shaft 110. Moreover, the aforedescribed construction of the apparatus 1 practically eliminates the possibility of any misalignment between the axis 110a of the input shaft 10 and the axis of the clutch actuating means 25. Therefore, the bearing 25a of the actuating means 25 can constitute a simple commercially available antifriction bearing rather than a complex self-centering bearing which must be used in many presently known clutch actuating devices.

In order to compensate for or to eliminate eventual or potential misalignment between the axis 110a of the crankshaft 5 and the axis of the tubular support 46 of the transmission housing 45 (i.e., between the axes of the sections 3 and 4), the damper 26 is preferably designed in such a way that its output component (including the discs 33, 34) has a certain freedom of radial movement with reference to the input component (hub 30 and extension 32). To this end, the internal surfaces of the discs 33, 34 surround the external surface of the hub 30 with a relatively small clearance 60 (denoted by a leg-end). In addition, the shanks of the rivets 36 are received with a relatively small radial play (which play can be seen in the drawing) in the respective arcuate slots 37 of the flange 31 on the hub 30.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transmitting torque between an internal combustion engine and a transmission having a housing and a rotary input element, particularly the change-speed transmission of a motor vehicle, comprising a composite flywheel including a plurality of coaxial flywheel sections, said sections comprising a first section and a second section and said first and second sections being rotatable relative to each other, said second section comprising a first pressure plate which is held against axial movment relative to the input element of the transmission; damper means for yieldably opposing rotation of said first and second section relative to each other, said damper means comprising an input component arranged to rotate with said first section and an output component arranged to rotate with said second section, said components having registering windows and said damper means further comprising energy storing means acting in the circumferential direction of said sections and installed in said windows; means for non-rotatably fastening said first section to the engine; means for releasably coupling said second section to the input element of the transmission, said coupling means comprising a second pressure plate which is movable axially with reference to said first pressure plate and a clutch disc interposed between said pressure plates and non-rotatably secured to the input element of the transmission; and means for non-rotatably but substantially axially movably securing one of said components to the respective section, including mating teeth on said one component and the respective section.

2. Apparatus for transmitting torque between an internal combustion engine and a transmission having a housing and a rotary input element, particularly the change-speed transmission of a motor vehicle, comprising a composite flywheel including a plurality of coaxial flywheel sections, said sections comprising a first section and a second section and said first and second sections being rotatable relative to each other; damper means for yieldably opposing rotation of said first and second sections relative to each other; means of non-rotatably fastening said first section to the engine; means for releasably coupling said second section to the input element of the transmission, said coupling means comprising a first plate which is rigid with said second section and a second plate which is movable axially of said sections, said damper means comprising an input component arranged to rotate with said first section and an output component arranged to rotate with said second section, said components having registering windows and said damper means further comprising energy storing means acting in the circumferential direction of said sections and installed in said windows; and means for non-rotatatably but substantially axially movably securing one of said components to the respective section, including mating teeth on said one component and the respective section.

3. Apparatus for compensating for rotational shocks, especially for fluctuations of torque which is transmitted between an internal combustion engine and a transmission having a rotary input element, comprising a composite flywheels having a first flywheel section arranged to rotate with the engine and a second section rotatable with reference to said first section; at least one antifriction bearing rotatably supporting said second section; means for releasably coupling said second section to the input element of the transmission; and damper means for yieldably opposing rotation of said sections relative to each other, said damper means comprising an input component arranged to rotate with said first section, an output component arranged to rotate with said second section, and means for non-rotatably but substantially axially movably securing one of said components to the respective section, said securing means comprising a key and spline connection, said components having registering windows and said damper means further comprising energy storing means acting in the circumferential direction of said sections and installed in said windows.

4. The apparatus of claim 3, wherein said transmission includes a support and said bearing is interposed between said second section and said support.

5. The apparatus of claim 4, wherein said support is a tubular body which coaxially surrounds the input element of the transmission and is surrounded by said bearings.

6. The apparatus of claim 4, wherein said coupling means comprises a friction clutch which is actuatable to effect and terminate the transmission of torque between said second section and the input element of the transmission, and means for actuating said clutch, said actuating means being movable along said support.

7. The apparatus of claim 6, wherein said support includes a tubular body and said actuating means comprises an annular portion which surrounds said tubular body.

8. The apparatus of claim 3, further comprising means for holding a portion of said second section against axial movement with reference to the input element of the transmission.

9. The apparatus of claim 3, wherein said coupling means comprises a first pressure plate provided on said second section, a second pressure plate movable axially of said sections, a clutch disc between said pressure plates, and means for yieldably biasing said second pressure plate against said clutch disc so that the latter is urged against said first pressure plate.

10. The apparatus of claim 9, wherein said biasing means comprises a diaphragm spring and said first pressure plate is disposed between said clutch disc and said diaphragm spring.

11. The apparatus of claim 10, wherein said first pressure plate has a radially outermost portion and said diaphragm spring includes a marginal section which bears against said radially outermost portion, said second section having apertures disposed radially inwardly of said radially outermost portion and said second pressure plate having projections extending through said apertures and toward said diaphragm spring radially inwardly of said marginal section, and further comprising means for tiltably securing said diaphragm spring to said projections.

12. The apparatus of claim 11, further comprising a pair of seats flanking said diaphragm spring in the region of said securing means.

13. The apparatus of claim 3, wherein one of said sections has an axial extension with external teeth and the respective component has internal teeth mating with said external teeth.

14. The apparatus of claim 13, wherein the component having said internal teeth is said input component.

15. Apparatus for compensating for rotational shocks, especially for fluctuations of torque which is transmitted between an internal combustion engine and a transmission having a rotary input element, comprising a composite flywheel having a first flywheel section arranged to rotate with the engine and a second flywheel section rotatable with reference to said first section; at least one antifriction bearing rotatably supporting said second section; means for releasably coupling said second section to the input element of the transmission; and damper means for yieldably opposing rotation of said sections relative to each other, said damper means comprising an input component arranged to rotate with said first section, an output component arranged to rotate with said second section, and means for non-rotatably but substantially axially movably securing one of said components to the respective section, one of said sections comprising an extension and said one component surrounding said extension, said securing means including axially parallel external teeth on said extension and axially parallel internal teeth provided in said one component and mating with said external teeth, said components having registering windows and said damper means further comprising energy storing means acting in the circumferential direction of said sections and installed in said windows.

16. The apparatus of claim 15, wherein said extension is a hollow cylinder.

* * * * *